(12) United States Patent
Mirabella et al.

(10) Patent No.: US 11,914,934 B2
(45) Date of Patent: Feb. 27, 2024

(54) ACTIVE REGION ADAPTATIONS FOR DESIGN DOMAINS IN TOPOLOGY OPTIMIZATIONS

(71) Applicant: Siemens Industry Software Inc., Plano, TX (US)

(72) Inventors: Lucia Mirabella, Plainsboro, NJ (US); Suraj Ravi Musuvathy, Princeton Junction, NJ (US); Yu-Chin Chan, Evanston, IL (US)

(73) Assignee: Siemens Industry Software Inc., Plano, TX (US)

( * ) Notice: Subject to any disclaimer, the term of this patent is extended or adjusted under 35 U.S.C. 154(b) by 300 days.

(21) Appl. No.: 17/273,587

(22) PCT Filed: Jul. 30, 2019

(86) PCT No.: PCT/US2019/044105
§ 371 (c)(1),
(2) Date: Mar. 4, 2021

(87) PCT Pub. No.: WO2020/055516
PCT Pub. Date: Mar. 19, 2020

(65) Prior Publication Data
US 2021/0200921 A1 Jul. 1, 2021

Related U.S. Application Data

(60) Provisional application No. 62/731,278, filed on Sep. 14, 2018.

(51) Int. Cl.
*G06F 30/23* (2020.01)
*G06F 111/04* (2020.01)
*G06F 111/02* (2020.01)

(52) U.S. Cl.
CPC .......... *G06F 30/23* (2020.01); *G06F 2111/02* (2020.01); *G06F 2111/04* (2020.01)

(58) Field of Classification Search
CPC .. G06F 30/23; G06F 2111/04; G06F 2111/02; G06F 30/25; G06F 30/367; G06F 30/398; G06F 2111/00; G06F 2119/22
See application file for complete search history.

(56) References Cited

U.S. PATENT DOCUMENTS

2008/0223653 A1* 9/2008 Kim ........................ G10K 11/16
181/286
2010/0058257 A1* 3/2010 Park ........................ G06F 30/00
716/132
(Continued)

FOREIGN PATENT DOCUMENTS

CN 102789533 A 11/2012
CN 102819679 A 12/2012
(Continued)

OTHER PUBLICATIONS

Kazuo Mitsui: "Optimal Shape and Topologyof Structure Searched by Ants" ForagingBehavior, Nov. 21, 2005 (Nov. 21, 2005), XP055631102.
(Continued)

*Primary Examiner* — Kibrom K Gebresilassie (57) ABSTRACT

A computing system may include an initial design space engine and an active region adaptation engine. The initial design space engine may be configured to identify a design domain for which to optimize a topology based on an objective function and determine an active region. The active region adaptation engine may be configured to iteratively adapt the active region until an optimization ending criterion is satisfied. Iterative adaptation of the active region may include expanding the design domain to include branch design elements, performing finite element analysis (FEA)
(Continued)

on the expanded design domain, and determining an adapted active region by activating some of the branch design elements based on an active sensitivity threshold and deactivating some of the active design element based on design variable value changes.

17 Claims, 7 Drawing Sheets

(56) References Cited

U.S. PATENT DOCUMENTS

| | | | | |
|---|---|---|---|---|
| 2010/0262406 | A1* | 10/2010 | Goel | G06F 30/15 |
| | | | | 703/2 |
| 2016/0078161 | A1* | 3/2016 | Roux | G06F 30/23 |
| | | | | 703/1 |
| 2018/0079149 | A1 | 3/2018 | Suresh et al. | |

FOREIGN PATENT DOCUMENTS

| | | |
|---|---|---|
| CN | 106096158 A | 11/2016 |
| CN | 107748916 A | 3/2018 |

OTHER PUBLICATIONS

Norio Inoue et al.: "Cellular automatongenerating topological structures", Microfluidics, Biomems, and Medicalmicrosystems Xi : Feb. 3-5, 2013, Sanfrancisco, California, United States ;[Part of Spie Photonics West]; In:Proceedings of SPIE; ISSN 0277-786X; vol. 8615,vol. 2361, Sep. 13, 1994 (Sep. 13, 1994), pp. 47-50, XP055547509.

Guest et al. "Reducing dimensionality in topology optimization using adaptive design variable fields." International journal for numerical methods in engineering 81.8 (2010): 1019-1045.

Nguyen, Tam H., et al. "A computational paradigm for multiresolution topology optimization (MTOP)." Structural and Multidisciplinary Optimization 41.4 (2010): 525-539.

Wang et al. "An adaptive refinement approach for topology optimization based on separated density field description." Computers & Structures 117 (2013): 10-22.

Baiges, Joan et al. "Large-scale stochastic topology optimization using adaptive mesh refinement and coarsening through a two-level parallelization scheme." Computer Methods in Applied Mechanics and Engineering (2018).

Aage, Niels, et al. "Topology optimization using PETSc: An easy-to-use, fully parallel, open source topology optimization framework." Structural and Multidisciplinary Optimization 51.3 (2015): 565-572.

Martinez-Frutos et al. "Efficient topology optimization using GPU computing with multilevel granularity." Advances in Engineering Software 106 (2017): 47-62.

Kim, Sun Yong et al. "A new efficient convergence criterion for reducing computational expense in topology optimization: reducible design variable method." International Journal For Numerical Methods in Engineering 90.6 (2012): 752-783.

Kim, Il Yong et al. "Design space optimization using a numerical design continuation method." International Journal for Numerical Methods in Engineering 53.8 (2002): 1979-2002.

Jang et al. "Design space optimization using design space adjustment and refinement." Structural and Multidisciplinary optimization 35.1 (2008): 41-54.

* cited by examiner

ACTIVE REGION ADAPTATIONS FOR DESIGN DOMAINS IN TOPOLOGY OPTIMIZATIONS

CROSS-REFERENCE TO RELATED APPLICATION

This application claims the benefit of priority to U.S. Provisional Application No. 62/731,278, filed on Sep. 14, 2018 and titled "Topology Optimization with Evolving Design Domain and Manufacturing Constraints for Large-Scale Problems", which is incorporated herein by reference in its entirety.

BACKGROUND

Computer systems can be used to create, use, and manage data for products and other items. Examples of computer systems include computer-aided design (CAD) systems (which may include computer-aided engineering (CAE) systems), computer-aided manufacturing (CAM) systems, visualization systems, product data management (PDM) systems, product lifecycle management (PLM) systems, and more. These systems may include components that facilitate the design and simulated testing of product structures and product manufacture.

BRIEF DESCRIPTION OF THE DRAWINGS

Certain examples are described in the following detailed description and in reference to the drawings.

DETAILED DESCRIPTION

The present disclosure relates to topology optimization, which may refer to technology that modifies the material layout of an object to achieve a particular goal. Topology optimization may be used in aerospace, mechanical, biochemical, automotive, and many other fields to, for example, improve the performance of parts or reduce a required weight of raw materials. In particular, topology optimization may utilize any number of objective functions to quantitatively measure design goals of a topology optimization process. As illustrative examples, objective functions may statistically express compliance, structural requirements, thermal behavior, fluid dynamics, or various characteristics of an object. Loads, boundary conditions, and other constraints may also be used in topology optimizations to enforce specific product requirements (e.g., in addition to or in combination with the objective function).

In topology optimizations, a design space may refer to an allowable area or volume within which an object can exist. Within the design space, a design domain may be identified in which to perform topology optimization for an object design. A design domain may be a subset (or equal to) a design space, and a design domain may be discretized into multiple design elements. As examples, design elements make take the form of 2D squares formed from discretizing a 2D design domain into a grid or as 3D voxels from discretizing a 3D design domain. Each design element in a design domain may be characterized with a respective design variable value through which topology optimization processes may compute or evaluate an objective function. Through various processing techniques such as simulation, variable optimizations, or finite element analysis, topology optimizations may modify design variable values (e.g., density values of voxels in a 3D design domain) to converge the objective function and design domain into an optimized topology for an object.

Topology optimization may provide technological capabilities to improve part performance or reduce part requirements (e.g., weight or input raw materials). However, topology optimization computations may be resource-intensive and require long amounts of time to complete, particularly for complex design spaces that can number in the millions of design elements and more. Performing hundreds or thousands of iterations of topology optimization processes on such immense design spaces can be impractical or near-impossible.

The disclosure herein may provide systems, methods, devices, and logic for active region adaptations for design domains in topology optimizations. As described in greater detail below, the active region adaptation features disclosed herein may evolve a design domain such that particularly selected portions of the design domain can change design variable values (whereas design variable values of the remainder of the design domain, e.g., a non-active region, remain constant during optimization or finite element analysis iterations). In that regard, the active region of a design domain may delineate specific design elements of an object design to focus optimization resources on, which may reduce the time and required resources to modify an object for performing simulations, finite element analysis (FEA), or other optimization computations and processes in order to topologically optimize the object.

The described active region adaptations may be particularly useful for large-scale design domains (e.g., millions of design elements and more), especially as computing resources can be directed towards specifically determined regions of a design domain and avoid simulating and optimizing non-active regions which may have less potential for modification via topology optimization. Accordingly, the active region adaptation features described herein may increase computing efficiency and reduce computational times to topologically optimize an object as compared to traditional topology optimization techniques.

These and other active region adaptation features and technical benefits are described in greater detail herein.

Figure 1:
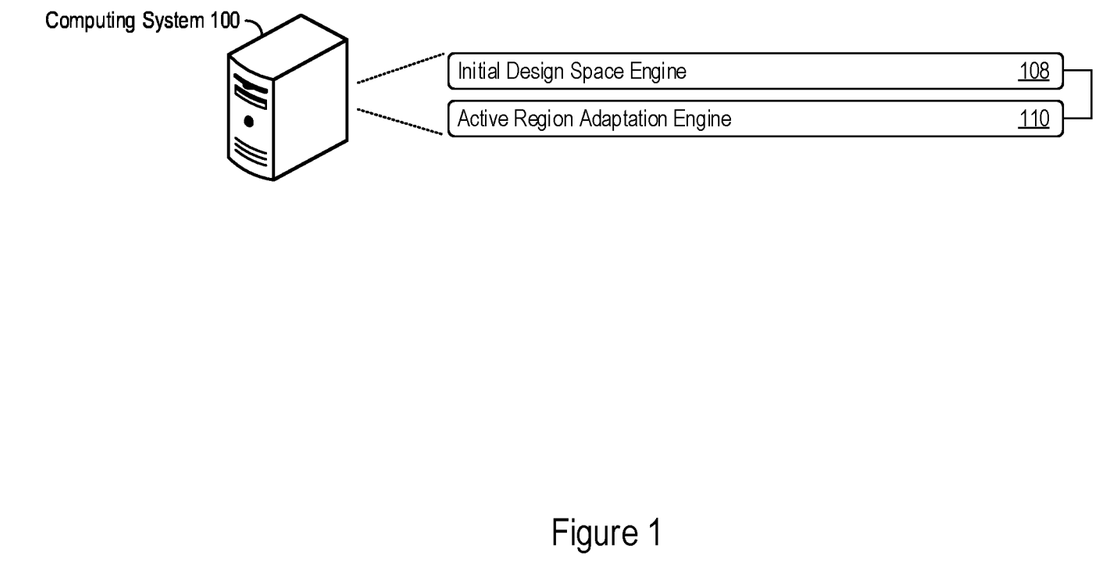
FIG. 1 shows an example of a computing system that supports active region adaptations for design domains in topology optimizations.

FIG. 1 shows an example of a computing system 100 that supports active region adaptations for design domains in topology optimizations. The computing system 100 may take the form of a single or multiple computing devices such as application servers, compute nodes, desktop or laptop computers, smart phones or other mobile devices, tablet devices, embedded controllers, and more.

As described in greater detail herein, active regions of a design domain may be determined and determined active regions may evolve during topology optimization. In particular, a determined active region of for a design domain may evolve during an adaptation cycle, during which design elements of a design domain with increased potential to change via topology optimization are identified and activated. Design elements with decreased potential to change may be deactivated, and topology optimization iterations may be performed specifically for the active region of the design domain. By doing so, the active region adaptation features described herein may adaptively activate and deactivate design elements of an object (e.g., voxels in a 3D space or boxes in a 2D space) to focus topology optimization on high-potential or high-sensitivity regions, which may thus increase the speed and efficiency of topology optimizations.

As an example implementation to support any combination of the active region adaptation features described herein, the computing system 100 shown in FIG. 1 includes an initial design space engine 108 and a active region adaptation engine 110. The computing system 100 may implement the engines 108 and 110 (including components thereof) in various ways, for example as hardware and programming. The programming for the engines 108 and 110 may take the form of processor-executable instructions stored on a non-transitory machine-readable storage medium and the hardware for the engines 108 and 110 may include a processor to execute those instructions. A processor may take the form of single processor or multi-processor systems, and in some examples, the computing system 100 implements multiple engines using the same computing system features or hardware components (e.g., a common processor or a common storage medium).

In operation, the initial design space engine 108 may identify a design domain for which to optimize a topology based on an objective function, the design domain comprising multiple design elements. The initial design space engine 108 may determine an active region for the design domain, the active region comprising a selected set of active design elements in the design domain. Initial determination of the design domain and active region by the initial design space engine 108 may depend on various parameters and characteristics of an input design space for the topology optimization process.

In operation, the active region adaptation engine 110 may iteratively adapt the active region, including by, for a given adaptation cycle, expanding the design domain to include branch design elements within a threshold element distance from the active design elements in the active region; performing FEA on the expanded design domain based on the objective function, including computing a respective sensitivity value based on the objective function for the design elements of the expanded design domain; determining an adapted active region; and setting the adapted active region as the active region for a subsequent adaptation cycle.

Determination of the adapted active region may be performed by the active region adaptation engine 110 by activating, as active design elements, any of the branch design elements with a computed sensitivity value that exceeds an active sensitivity threshold and deactivating, from the active region, any active design element with a design variable value that changes less than a threshold amount from a previous adaptation cycle. The active region adaptation engine 110 may continue to iteratively adapt the active region until an optimization ending criterion is satisfied, whereupon the topology optimization process may complete.

Figure 2:
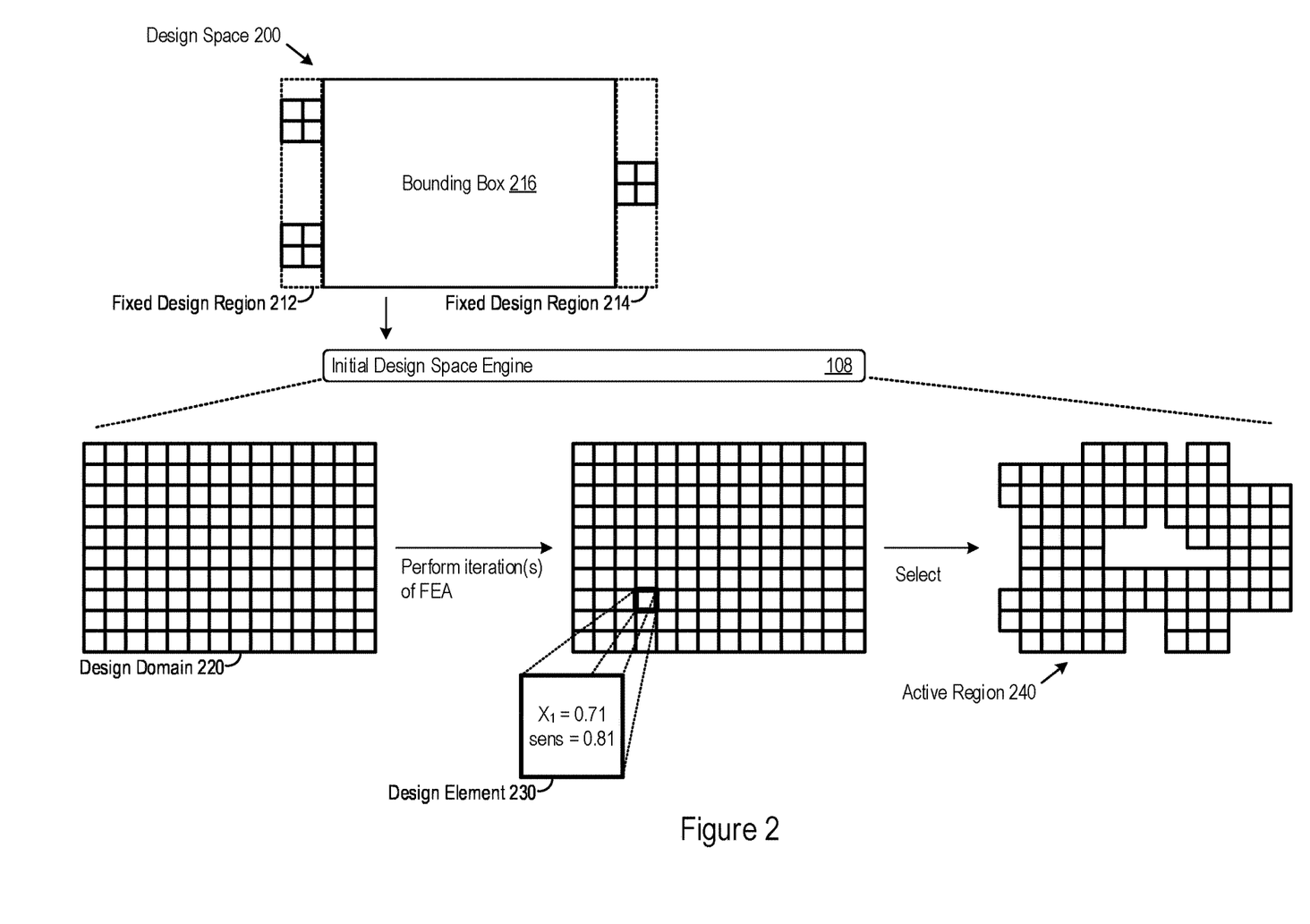
FIG. 2 shows an example of a design domain identification and initial active region determination by an initial design space engine for an unknown starting topology.
Figure 3:
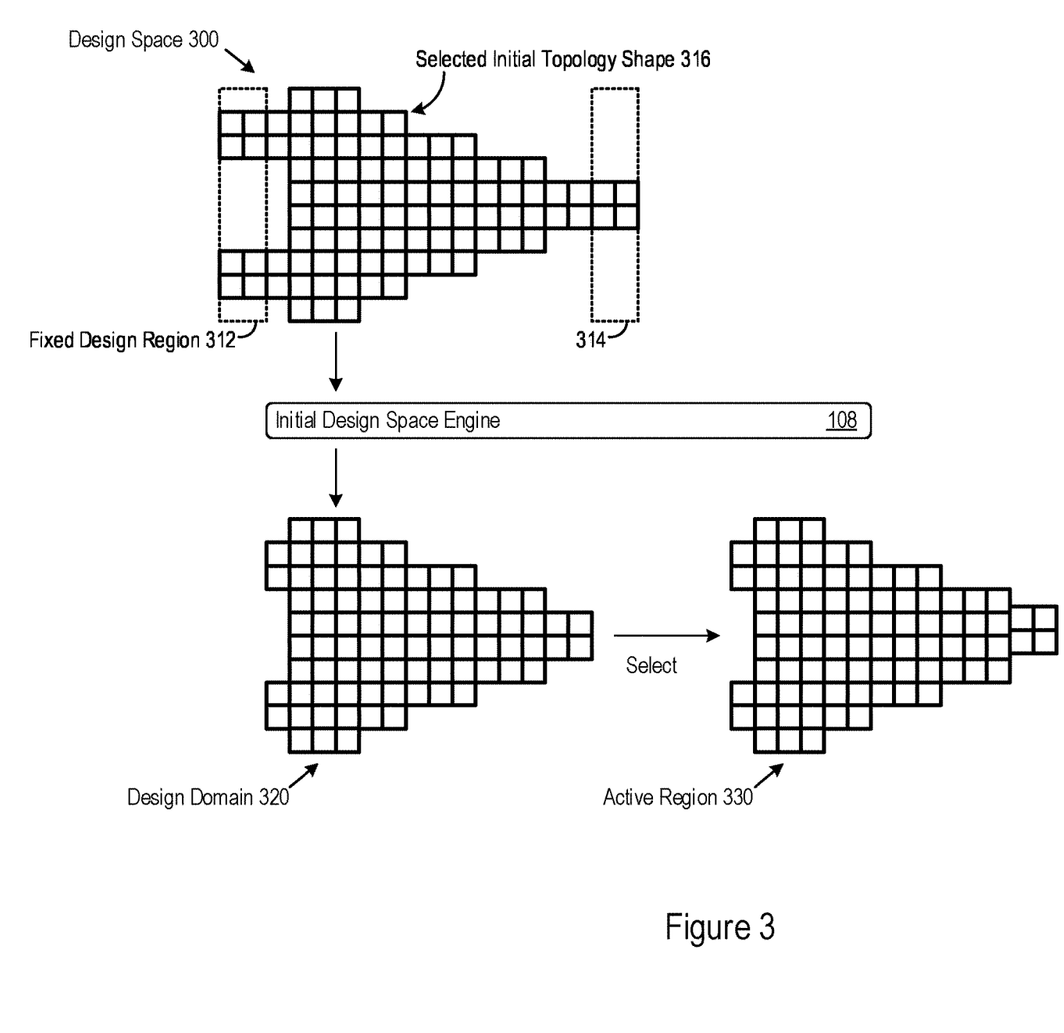
FIG. 3 shows an example of a design domain identification and initial active region determination by the initial design space engine for a known starting topology.
Figure 4:
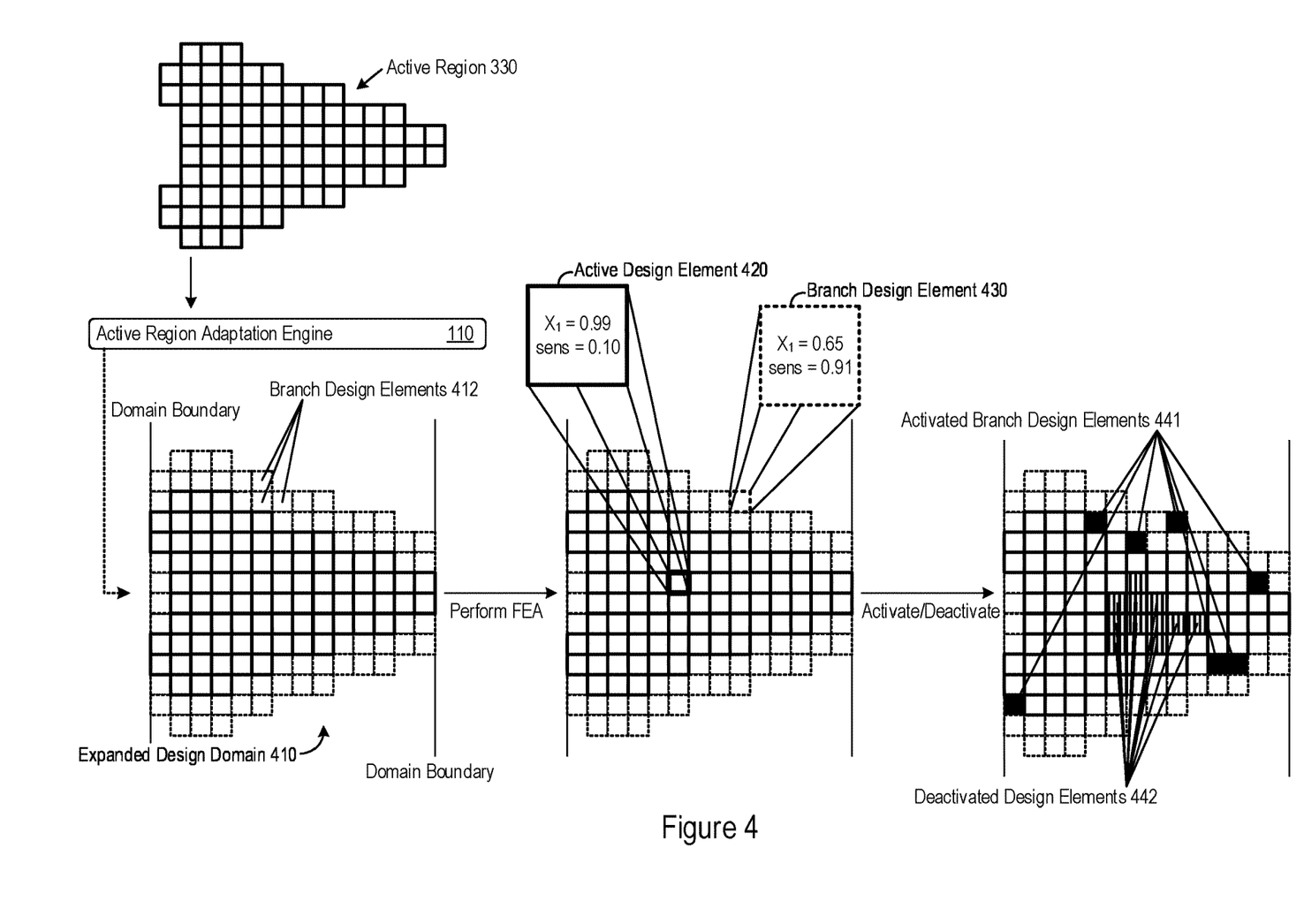
FIG. 4 shows an example of design element activations and deactivations by an active region adaptation engine to adapt a determined active region.
Figure 5:
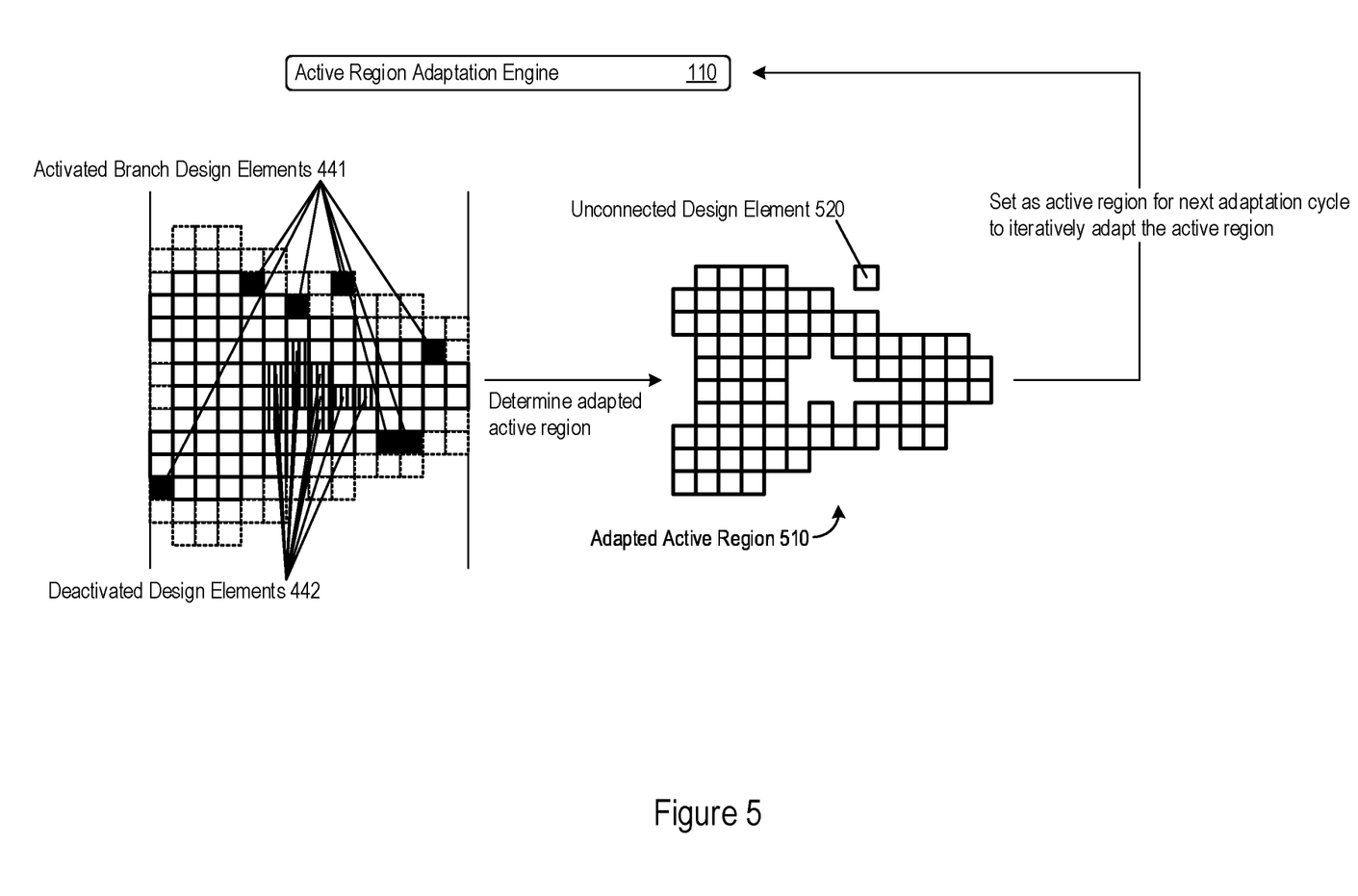
FIG. 5 shows an example of an adapted active region that the active region adaptation engine may determine and set as the active region for a subsequent adaptation cycle.

These and other active region adaptation features according to the present disclosure are described in greater detail next. FIGS. 2 and 3 describe various features in connection with determination of an initial active region in a design space. FIGS. 4 and 5 describe various features in connection with adapting the active region in different adaptation cycles. Many of the examples described in connection with FIGS. 2-5 are presented via 2-dimensional (2D) design spaces, design domains, and active regions. However, any of the active region adaptation features disclosed herein may also be consistently applied to topology optimizations in other dimensions (e.g., 3D).

Turning to active region determinations, the initial design space engine 108 may identify an initial design domain and determine an initial active region. Moreover, the initial design space engine 108 may do so in different ways based on whether a design space comprises a known starting topology or an unknown starting topology.

FIG. 2 shows an example of a design domain identification and initial active region determination by the initial design space engine 108 for an unknown starting topology. In FIG. 2, the initial design space engine 108 accesses a design space 200, which may take the form of any digital representation of an object and the object may have vary levels of complexity and scale, e.g., as a part, a sub-system, an aerospace component, an entire space shuttle, etc. The design space 200 may include any number of CAD files, 3D surface meshes or geometry files, or any other suitable geometric representations of a design object (which may vary greatly in complexity to include large-scale topology optimization design spaces).

The design space 200 may include various portions, such as the fixed design regions 212 and 214. Such fixed design regions 212 and 214 may specify fixed designs, features, or components for an object (e.g., design elements that cannot change via topology optimization). For instance, the fixed design regions 212 and 214 may include permanently passive regions (either solid or void) that are configured to not change from topology optimization, and such regions may be referred to as "keep-in" or "keep-out" regions. In some implementations, the design space 200 may also specify boundary conditions, constraints, or other design parameters applicable to the design space 200 or portions thereof.

The design space 200 accessed by the initial design space engine 108 may include an unknown starting topology to optimize via topology optimization based on one or more objective functions. An unknown starting topology can refer to a component of a design space 200 with a topology limited only by dimensions that bound an object design but without any particular design beyond the dimension limitations. In the particular example shown in FIG. 2, the design space 200 includes an unknown starting topology in the form of a bounding box 216. The bounding box 216 may be an unknown starting topology in that the bounding box 216 is defined in a box shape by the dimensions in which an object design for the design space 200 can exist. However, no starting design within the bounding box 216 is specified as a starting point for topology optimization (e.g., in contrast to a prior part design, test design, or other predetermined starting design).

The initial design space engine 108 may identify an initial design domain from the design space 200 as portions of the design space 200 that can be modified (e.g., optimized) via topology optimization. For designs that include an unknown starting topology (e.g., via a bounding structure such as the bounding box 216), the initial design space engine 108 may identify an initial design domain for topology optimization as the entirety of the unknown starting topology. To illustrate through FIG. 2, the initial design space engine 108 may identify the design domain 220 as the bounding box 216 for an unknown topology, and may discretize the design domain 220 to include multiple design elements (in this case squares in a 2D grid).

From the initial design domain (e.g., the design domain 220), the initial design space engine 108 may determine an initial active region. Determination of the initial active region may be referred to as adaptation cycle '0' of a topology optimization process. To determine an initial active region for the design domain 220 identified from an unknown starting topology, the initial design space engine 108 may perform a configurable number of topology optimization iterations on the entirety of the design domain 220. This configurable number may be a process parameter determined by the initial design space engine 108 based on a preset or user-provided value (e.g., two (2) iterations of FEA on all of the design elements in the bounding box 216).

In some topology optimization iteration examples, the initial design space engine 108 may perform FEA for each of the design elements in the bounding box 216 to compute the value of an objective function for the topology optimization process. Any topology optimization computation is contemplated in the topology optimization iteration(s) performed in adaptation cycle '0' by the initial design space engine 108, such as numerical optimizations, locking converged design variable values, modifying design variable values, enforcing constraints and boundary conditions, etc. As used herein, FEA may encompass or include any combination (e.g., all) of such topology optimization operations, and the initial design space engine 108 (and the active region adaptation engine 110) may implement FEA capabilities to perform any topology optimization process or computation.

In performing FEA on the bounding box 216, the initial design space engine 108 may initialize design elements of the design domain 220 with preconfigured design variable values to perform the FEA, adjust design variable values, and perform various computational operations of the FEA. For instance, the initial design space engine 108 may treat the bounding box 216 as a solid structure to topologically optimize, e.g., with density values for each design element initialized to a fully solid value (such as density value=1.0 on a normalized scale from 0.0-1.0).

By performing FEA on the entirety of the bounding box 216 (which can be computationally intensive), the initial design space engine 108 may identify particular regions of the design domain 220 that have increased potential or impact to improve a design for a particular design goal (e.g., as measured via the objective function). To measure such potential, the initial design space engine 108 may compute sensitivity values for design elements in the bounding box 216. The initial design space engine 108 may compute the sensitivity value sens for a given design element based on a derivative of the objective function and design variable value of the given design element, for example as:

$$sens = \left|\frac{\partial c}{\partial x}\right|$$

In this example, x may refer to the design variable value of the given design element and c may refer to the objective function (e.g., compliance). The sensitivity value of a particular design element may measure the degree to which changes in the objective function depend from changes to the design variable value of the particular design element. Design variable changes (and, in some implementations, sensitivity computations) may be performed as part of (or in combination with) performed FEA iterations for topology optimizations.

Accordingly, the initial design space engine 108 may compute design variable values and sensitivity values for the design elements included in an unknown starting topology, such as the bounding box 216. In FIG. 2, the design element 230 depicts example computation results, including computed values of the design element 230 for a design variable $x_1$ (with a density value of 0.71) and sensitivity sens (with a normalized sensitivity value of 0.81).

From the computed sensitivity values, the initial design space engine 108 may determine an initial active region for the design domain 220. In particular, the initial design space engine 108 may select, as active design elements of the initial active region, any design elements in the bounding box 216 that exceed a bounding sensitivity threshold. The bounding sensitivity threshold may be a predetermined and/or configurable parameter to control determination of initial active regions of unknown starting topologies. As an illustrative example, the initial design space engine 108 may normalize computed sensitivity values (e.g., to a normalized range between 0.0 and 1.0 inclusive) and set the bounding sensitivity threshold to a fixed value (e.g., of 0.8). As other examples, the initial design space engine 108 may set the bounding sensitivity threshold as a computed value, for example as an average sensitivity of the design elements in the bounding box 216, based on standard deviations from the set of sensitivity values for the design domain 220, as a computed value to activate a threshold portion (e.g., 75%) of the design domain 220, or according to any other configurable function.

In the example shown in FIG. 2, the initial design space engine 108 determines an initial active region for the design domain 220 as the active region 240. Design elements included in the active region 240 may be referred to as active design elements, and design variable values of active design elements may change in subsequent iterations of FEA and topology optimization processes. Design elements of the design domain 220 not included in the active region 240 may have their design variable values fixed during subsequent FEA iterations.

In any of the ways described herein, the initial design space engine 108 may determine an initial active region for a design domain 220 comprised of an unknown starting topology. In other examples, the initial design space engine 108 may determine an initial active region for a design domain comprised of a known starting topology, as discussed next in connection with FIG. 3.

FIG. 3 shows an example of a design domain identification and initial active region determination by the initial design space engine 108 for a known starting topology. In FIG. 3, the initial design space engine 108 accesses a design space 300 for an object design. In a similar manner as the design space 200 described with respect to FIG. 2, the design space 300 may include fixed design portions, such as the fixed design regions 312 and 314 shown in FIG. 3. As also shown in FIG. 3, the design space 300 includes a known starting topology in the form of a selected initial topology shape 316.

A known starting topology may be specified for the design space 300 in various ways. For instance, the initial design space engine 108 may support various user input capabilities by which a user may specify, select, or otherwise input a starting topology as part of an object design to be topologically optimized. In some instances, the initial design space engine 108 may be configured to identify or determine past part designs as a starting topology. In other examples, the design space 300 includes user-selected or user-input designs as starting topologies.

By supporting topology optimizations with a starting topology, the initial design space engine 108 may increase the speed at which topology optimization converges on an optimized solution for the design space 300. As compared to unknown starting topologies (e.g., the bounding box 216), starting with a known topology may reduce the number of active region adaptations and FEA iterations performed for topology optimization. Explained another way, the active region adaptation features may support convergence to a topologically optimized design with the selected initial topology shape 316 with a lesser number of adaptation cycles, topology optimization (e.g., FEA) iterations, and with reduced computational resource consumption and lesser computing latency as compared to starting with an unknown topology.

In some implementations, a known starting topology may allow the initial design space engine 108 to limit an initial design domain to specific portions of a design space that are known to be solid as reflected in the known starting topology. That is, by using the selected initial topology shape 316, the initial design space engine 108 has the capability to start with a reduced portion of a design space 300 to optimize (e.g., as compared to the bounding box 216) which may thus improve performance.

As noted herein, the initial design space engine 108 may identify an initial design domain as portions of a design space that can be modified (e.g., optimized) via topology optimization. For designs that include a known starting topology (e.g., the design space 300 that includes the selected initial topology shape 316), the initial design space engine 108 may identify an initial design domain as the solid portions of the selected initial topology shape 316. As seen in FIG. 3, the initial design space engine 108 identifies the design domain 320 for the design space 300, and the design domain 320 includes each of the design elements of the selected initial topology shape 316.

From the initial design domain (e.g., the design domain 320), the initial design space engine 108 may determine an initial active region. Such an initial active region determination may be part of adaptation cycle '0' of a topology optimization process. For the design domain 320 identified from a known starting topology, the initial design space engine 108 may identify the initial active region as the entirety of the design domain 320. As seen in FIG. 3, the initial design space engine 108 determines the active region 330 as an initial active region by selecting each of the design elements in the selected initial topology shape 316 (that is, the design domain 320) as active design elements to comprise the active region 330.

In some implementations, the initial design space engine 108 may perform a configurable number of topology optimization iterations on the design domain 320 (e.g., the same number of FEA iterations performed on an initial design domain for unknown starting topologies). Such FEA iterations may be performed by the initial design space engine 108 before, concurrent with, or after determination of the active region 330.

As described herein, the initial design space engine 108 may determine an initial design domain and an initial active region for topology optimization, whether with a known or unknown starting topology. Through active region adaptations, specific portions of a design domain are focused on to topologically optimize. That is, instead of performing topology optimization on the entirety of a design space of an object design, topology optimizations may be specifically limited to the active region, which can result in more efficient use of computational resources. In particular, active region adaptations may focus on identifying portion of a design space with a higher potential to change or improve topology (which may thus more efficiently focus computational resources). In addition, FEA could be potentially be performed only on the active region by the initial design space engine 108 or the active region adaptation engine 110, which may improve performance and reduce computational latencies as compared to performing FEA across an entire design space. FIGS. 4 and 5 next describe various features in connection with adapting the active region in different adaptation cycles.

Note that active region adaptations by an active region adaptation engine 110 may be performed as part of or in connection with topology optimization. As such, the active region adaptation engine 110 may adapt active regions as part of a topology optimization process by which design elements of a design domain may change (e.g. in density) during optimization. FEA performed in topology optimization may include topology optimization operations to modify and optimize the topology of an object design, whereas the active region adaptations described herein may identify specific portions of an object design (via an active region) in which to perform the FEA and topology optimization operations. As described herein, the iterative process in which an active region is adapted may be referred to in terms of adaptation cycles while topology optimization iterations may be referred to in terms of FEA iterations.

FIG. 4 shows an example of design element activations and deactivations by the active region adaptation engine 110 to adapt a determined active region. The example shown in FIG. 4 uses the active region 330 determined in FIG. 3 as an example of an initial active region to adapt. Some or all of the features described in FIG. 4 may comprise part of an adaptation cycle to adapt the active region 330 as part of a topology optimization process.

In a given adaptation cycle, the active region adaptation engine 110 may expand a design domain. By expanding a design domain, the active region adaptation engine 110 may ensure the design space in which a design object can be optimized is considered to a greater degree (e.g., at specific portions determined to have high sensitivities to the object function). To expand the design domain, the active region adaptation engine 110 may extend the design domain to include branch design elements within a threshold element distance from the active design elements in the active region 330. As an illustrative example, the active region adaptation engine 110 may expand the design domain to include any 3D voxels (not already in the active region) that are within a two 3D voxel distance from a 3D voxel in the active region (e.g., in any direction). As such, the active region adaptation engine 110 may identify branch design elements as neighboring design elements within a threshold element distance or other branch criteria (e.g., within two design elements in any direction or any other configurable distance value or criteria).

In some ways, expansion of the design domain by the active region adaptation engine 110 may be viewed as a temporary expansion of the active region in order to consider candidate activations into the active region. Moreover, the active region adaptation engine 110 may selectively expand a design domain using sensitivity values of an objective function in that design domain expansion is focused specifically from the active region (which may be comprised of active design elements that have previously been determined to have relatively higher sensitivity/potential to improve topology). In that regard, the active region adaptation features described herein may focus active region adaptations on object portions proximate to (e.g., within a design element distance) from active design elements with higher sensitivities and greater potential to optimize object design.

In some implementations, the active region adaptation engine 110 may limit design domain expansion. For instance, the active region adaptation engine 110 may limit domain design expansion such that no domain boundaries are passed. Domain boundaries may provide absolute limits on portions of a design space that a design object can extend into. For instance, domain boundaries may be set such that a design domain does not expand into fixed design portions (e.g., the fixed design regions 312 or 314), does not violate any boundary conditions or other design limitations, does not expand beyond a bounding box or delineated design space, and the like. Some example domain boundaries are illustrated in FIG. 4 as vertical lines that bound the degree to which an object design can expand horizontally.

In FIG. 4, the active region adaptation engine 110 expands a design domain from the active region 330 to include the branch design elements illustrated with a dotted perimeter. Some of these branch design elements included in the expanded design domain are expressly labeled as the branch design elements 412. As seen in FIG. 4, the active region adaptation engine 110 limits the design domain expansion such that branch design elements cannot cross domain boundaries set for a design object. In some implementations, the active region adaptation engine 110 may add any identified branch design elements in the expanded design domain into a FEA field used to map design elements of an object design for FEA operations.

The active region adaptation engine 110 may perform FEA on the expanded design domain, doing so based on any number of objective functions specified for topology optimization. The active region adaptation engine 110 may perform a FEA iteration on design elements of the expanded design domain in any of the ways described herein, e.g., in a consistent manner as the initial design space engine 108. The active region adaptation engine 110 may thus implement any of the FEA capabilities described herein (including supporting any number of topology optimization operations). In performing the FEA, the active region adaptation engine 110 may compute a respective sensitivity value based on the objective functions for the design elements of the expanded design domain.

In some implementations, the active region adaptation engine 110 may perform multiple iterations of FEA in a given adaptation cycle. Thus, for a given expanded design domain, the active region adaptation engine 110 may perform multiple FEA iterations (that may include various topology optimization operations to modify and configure design variables), and may so before adapting the active region in a given adaptation cycle.

Upon performing one or more FEA iterations for the expanded design domain, the active region adaption engine 110 may access computed sensitivity values for active design elements in the active region 330, branch design elements identified for an expanded design domain in a given adaptation cycle, or a combination of both. Design variable values can also be updated via the FEA iterations, which the active region adaptation engine 110 may also access. One such example (shown in FIG. 4) is the active design element 420 with a computed design variable value of 0.99 for design variable $x_1$ and a computed sensitivity value of 0.10 for sensitivity sens. Another example shown in FIG. 4 is the branch design element 430 with a computed design variable value of 0.65 for design variable $x_1$ and a computed sensitivity value of 0.91 for sensitivity sens.

Using computed sensitivity and/or design variable values, the active region adaptation engine 110 may determine an adapted active region for the current adaptation cycle. In particular, the active region adaptation engine 110 may do so by activating, as active design elements, any of the branch design elements with a computed sensitivity value that exceeds an active sensitivity threshold. The active region adaptation engine 110 may set, configure, or otherwise determine the active sensitivity threshold in various ways. By tuning the active sensitivity threshold, the active region adaptation engine 110 may control the degree at which branch design elements are activated, e.g., with (relatively) lesser active sensitivity threshold values supporting increased activations of branch design elements into an adapted active region and vice versa.

In some implementations, the active sensitivity threshold is a function of the computed sensitivity values for the active region of a previous adaptation cycle. The active region adaptation engine 110 may compute active sensitivity threshold as, for example, the average of the sensitivity values for the active region 330 as computed in a previous adaptation cycle (e.g., computed from performing FEA in the previous adaptation cycle). Other example computations of the active sensitivity threshold may include a minimum computed sensitivity value, a percentage of the minimum computed sensitivity value (e.g., 125%), a percentage of the minimum computed sensitivity value (e.g., 65%), etc. In some implementations, the active region adaptation engine 110 may set the active sensitivity threshold as a fixed value (e.g., 0.5 for a normalized range of sensitivity values from 0.0 to 1.0). In any such ways, the active region adaptation engine 110 may activate any number of branch design elements identified in a given adaptation cycle, e.g., doing so based on sensitivity values computed for the branch design elements in the given adaptation cycle.

The active region adaptation engine 110 may also determine an adapted active region by deactivating design elements. To do so, the active region adaptation engine 110 may deactivate, from the active region for a given adaptation cycle, any active design element with a design variable value that changes less than a threshold amount from a previous adaptation cycle. As one example, the active region adaptation engine 110 may deactivate a given design element in the active region 330 if the following convergence criterion is satisfied:

$$|x_i - x_{i-1}| < 10^{-6}$$

In this example, the value $x_i$ represents the design variable value of the given design element in adaptation cycle i, the value $x_{i-1}$ represents the design variable value of the given design element in the prior adaptation cycle i−1, and the value $10^{-6}$ represents a convergence threshold value that a design variable value has to change less than between adaptation cycles for the active region adaptation engine 110 to deactivate the given design element.

Accordingly, the active region adaptation engine 110 may deactivate design elements based on convergence of design variable values. In some implementations, the active region adaptation engine 110 may freeze such deactivated elements as permanently passive elements of the design. For instance, the active region adaptation engine 110 may freeze design elements such that (i) the design variable value of deactivated or frozen design elements can no longer change during topology optimization; (ii) the deactivated or frozen design elements can no longer be activated or identified as branch design elements; (iii) the design variable value of deactivated or frozen design elements is set to a predetermined value (e.g., 0.0 to indicate a void space in the design or 1.0 to indicate a filled space in the design); or any combinations thereof.

As described herein, the active region adaptation engine 110 may activate and/or deactivate various design elements from an active region in a given adaptation cycle. In the example shown in FIG. 4, the active region adaptation engine 110 activates some of the branch design elements identified from the active region 330, shown as design elements colored in black and labeled as the activated branch design elements 441. Also shown in FIG. 4, the active region adaptation engine 110 deactivates some of the active design elements in the active region 330, shown as design elements illustrated with a vertical line patterning and labeled as the deactivated design elements 442. Through such activations and deactivations, the active region adaptation engine 110 may adapt the active region 330 and determine an adapted active region for the active region 330.

FIG. 5 shows an example of an adapted active region that the active region adaptation engine 110 may determine and set as the active region for a subsequent adaptation cycle. In the specific example shown in FIG. 5, the active region adaptation engine 110 determines the adapted active region 510, which the active region adaptation engine 110 may adapt from a previously determined active region (in this example, the active region 330, as discussed in FIGS. 3 and 4).

As noted herein, the active region adaptation engine 110 may determine the adapted active region 510 from activated and deactivated design elements in a design domain. In particular, the active region adaptation engine 110 may adapt the active region 330 into the adapted active region 510 by adding the activated branch design elements 441 and removing the deactivated design elements 442. Then, the active region adaptation engine 110 may set the adapted active region 510 as the active region for a subsequent adaptation cycle.

Note that the active region adaptation features described herein can support active region adaptations without connectivity limitations. For instance, the active region adaptation engine 110 may activate branch design elements that are not directly linked to any other active design elements. An example of such an unconnected activation is shown in FIG. 5 through the unconnected design element 520, which the active region adaptation engine 110 may activate (and thus add to the adapted active region 510), doing so even though the unconnected design element 520 is not directly proximate or connected to any other active design element in the adapted active region 510. By supporting such unconnected activations, active regions adapted by the active region adaptation engine 110 may freely evolve into regions of a design space with increased sensitivities without connectivity limitations, (e.g., if supported by the FEA simulator and underlying physics).

Such unconnected active region features may support topology optimizations with increased efficiency or effectiveness, as multiple unconnected regions of a design space can be concurrently optimized in the same adaptation cycle or FEA iteration after the active region evolves in different portions of a design space. In some implementations, the active region adaptation engine 110 may maintain separate fields for FEA elements and the active region, and thus support FEA operations across an entire design space while also allowing an active region to evolve freely based on adaptations by the active region adaptation engine 110.

As shown in FIGS. 4 and 5, the active region adaptation engine 110 may adapt the active region 330 into the adapted active region 510. Such an active region iteration may comprise one of multiple adaptation cycles that the active region adaptation engine 110 may perform during topology optimization of a design space. In a subsequent adaptation cycle, the active region adaptation engine 110 may further adapt the adapted active region 510, and continue to iteratively adapt active regions until an optimization ending criterion is satisfied.

The active region adaptation engine 110 may set the optimization ending criterion in various ways, and the optimization ending criterion may be satisfied upon design convergence. For example, the optimization ending criterion may be satisfied when a difference between a value of the objective function between adaptation cycles is less than an optimization process ending value. In such an example, convergence of the objective function may indicate a topology of the object design has converged and an optimized design has been determined. For instance, the active region adaptation engine 110 may set the optimization ending criterion as the following:

$$\frac{|obj_i - obj_{i-1}|}{obj_{i-1}} < 10^{-3}$$

In this example, the value $10^{-3}$ represents the optimization process ending value, $obj_i$ represents the value of the objective function computed for adaptation cycle i, and $obj_{i-1}$ represents the value of the objective function computed in the prior adaptation cycle i−1.

Additionally or alternatively, the active region adaptation engine 110 may set the optimization ending criterion such that it is satisfied when the active region does not include any active design elements. Such an optimization ending criterion may be satisfied when all the design elements of an active region are deactivated in a given adaptation cycle.

Accordingly, the active region adaptation engine 110 may adapt an active region of a design space. The active region adaptation engine 110 may continue to iteratively adapt the active region of a design space until the optimization ending criterion is satisfied, upon which a topology optimization process may complete.

The active region adaptation features described herein may provide various technical benefits, including through use of sensitivities to adaptively activate design elements with increased potential to improve a topology while also supporting deactivation and freezing of design elements that have converged design variable values. Unconnected evolving of active regions are also supported by the active region adaptation features described herein. Such a feature may may lead to an increased reduction in the number of design variables, which may then further reduce computational requirements for FEA iterations or result in quicker design convergence. Moreover, adapting the active region on a per-adaptation cycle may support performing multiple FEA iterations per adaptation cycle, which may be more forgiving and increase accuracy for topology optimizer implementations that may cause design variables to fluctuate between FEA iterations.

With these and other technical benefits described herein, the described active region adaptation technology may decrease the computational expense of topology optimizations and improve efficiency, particularly for large-scale design spaces or when a known starting topology is accessed. Moreover, the active region adaptation features may be implemented or performed without powerful (e.g. high-performance) computing resources. As yet another feature, adaptation cycles may support application and adaptation of design or manufacturing constraints to further tune or increase the efficiency of topology optimizations.

Figure 6:
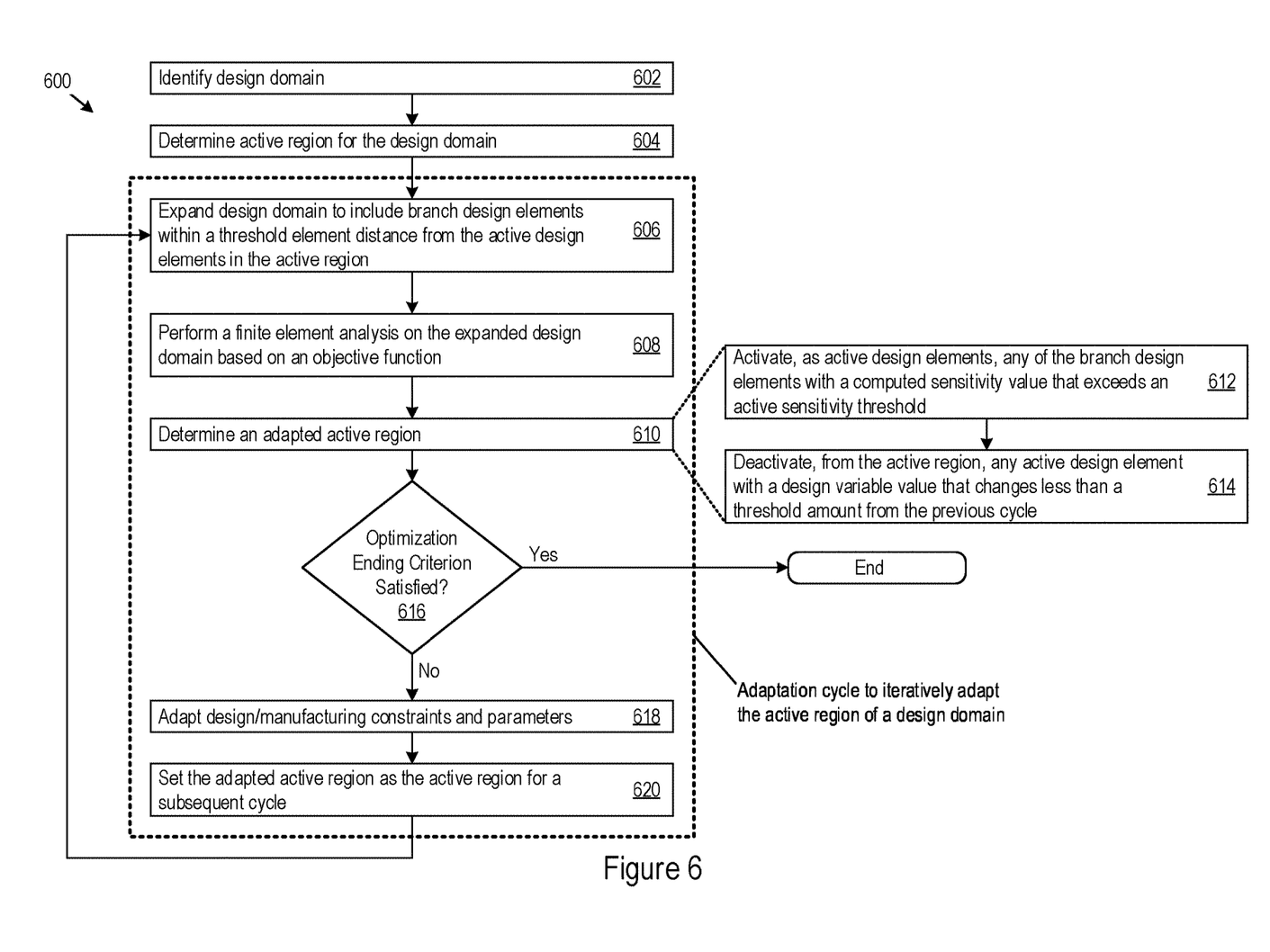
FIG. 6 shows an example of logic that a system may implement to support active region adaptations for design domains in topology optimizations.

FIG. 6 shows an example of logic 600 that a system may implement to support active region adaptations for design domains in topology optimizations. For example, the computing system 100 may implement the logic 600 as hardware, executable instructions stored on a machine-readable medium, or as a combination of both. The computing system 100 may implement the logic 600 via the initial design space engine 108 and the active region adaptation engine 110, through which the computing system 100 may perform or execute the logic 600 as a method to support active region adaptations in topology optimizations. The following description of the logic 600 is provided using the initial design space engine 108 and the active region adaptation engine 110 as examples. However, various other implementation options by systems are possible.

In implementing the logic 600, the initial design space engine 108 may identify a design domain (602) and determine an active region for the design domain (604). As described herein, the initial design space engine 108 may determine an initial active region as part of adaptation cycle '0' of a topology optimization process, and the initial design space engine 108 may support determination of initial active regions for both known and unknown starting topologies.

In implementing the logic 600, the active region adaptation engine 110 may iteratively adapt the active region of a design domain as part of a topology optimization. In a given adaptation cycle, the active region adaptation engine 110 may expand a design domain to include branch design elements within a threshold element distance from the active design elements in the active region (606). The active region adaptation engine 110 may simulate and optimize design elements in the active region, and may do so by performing FEA on the expanded design based on an objective function specified for the topology optimization (608).

FEA processes performed by the active region adaptation engine 110 may include computation of sensitivity values for design elements in the expanded design domain (e.g., that may comprise the active region for the current adaptation cycle as well as branch design elements identified in the current adaptation cycle). The active region adaptation engine 110 may perform multiple iterations of the FEA in a given adaptation cycle, doing so prior to determination of an adapted active region for the given adaptation cycle. In some implementations, the active region adaptation engine 110 may perform a configured number of FEA iterations in a given adaptation cycle (e.g., ten (10) FEA iterations). Additionally or alternatively, the active region adaptation engine 110 may perform a FEA iterations until the value of the objective function changes by less than a threshold amount between FEA iterations. As a combination of such criteria, the active region adaptation engine 110 may perform a preconfigured number of FEA iterations (e.g., ten (10) iterations) unless the value of the objective function changes by less than a threshold amount between FEA iterations before the preconfigured number of FEA iterations is performed in a given adaptation cycle.

In implementing the logic 600, the active region adaptation engine 110 may also determine an adapted active region (610). The active region adaptation engine 110 may do so by activating, as active design elements, any of the branch design elements with a computed sensitivity value that exceeds an active sensitivity threshold (612); and deactivating, from the active region, any active design element with a design variable value that changes less than a threshold amount from a previous adaptation cycle (614).

The active region adaptation engine 110 may continue to iteratively adapt active regions until an optimization ending criterion is satisfied (at which point the topology optimization process may also end). Accordingly, the active region adaptation engine 110 may determine whether an optimization ending criterion is satisfied (616). If so, the active region adaptation and topology optimization process may end. If not, the active region adaptation engine 110 may continue to iteratively adapt the active region and topologically optimize the design space.

In some implementations, the active region adaptation engine 110 may support use and adaption of design or manufacturing constraints in topology optimization of a design space. For instance, the initial design space engine 108, the active region adaptation engine 110, or both may apply Heaviside density filters, overhang constraints (e.g., ratios), Solid Isotropic Microstructures with Penalization (SIMP) penalty parameters, and more as part of FEA iterations or other topology optimization operations. Moreover, the active region adaptation engine 110 may support adaptation of any applied parameters or constraints, e.g., on a per-adaptation cycle basis.

In a given adaptation cycle, the active region adaptation engine 110 may adapt any number of applied design/manufacturing constraints or parameters (618). In doing so, the active region adaptation engine 110 may adjust parameter or constraint values, activate or deactivate design/manufacturing parameters or constraints to apply in a subsequent adaptation cycle, or combination of both. For instance, in each adaptation cycle, the active region adaptation engine 110 may increase Heaviside beta and SIMP penalty parameters, which may increase the speed of design variable convergence or reduce topology optimization stalls for intermediate design variable values. By adapting such manufacturing constraints or parameters on a per-adaptation cycle basis, the active region adaption engine 110 may support tiered adaptation of such constraints and parameters during topology optimization (as compared on a per-FEA iteration basis, which may less effective due to noise or spikes in topology optimization).

Upon or after determination that the optimization ending criterion is not satisfied, the active region adaptation engine 110 may continue to iteratively adapt the active region. As such, the active region adaptation engine 110 may set an adapted active region determined for a current adaptation cycle as the active region for a subsequent adaptation cycle (620). Then, the active region adaptation engine 110 may continue to iteratively adapt the active region until an optimization ending criterion is satisfied.

The logic 600 shown in FIG. 6 provides illustrative examples by which a computing system 100 may support active region adaptations for design domains in topology optimizations. Additional or alternative steps in the logic 600 are contemplated herein, including according to any features described herein for the initial design space engine 108, active region adaptation engine 110, or any combinations thereof.

Figure 7:
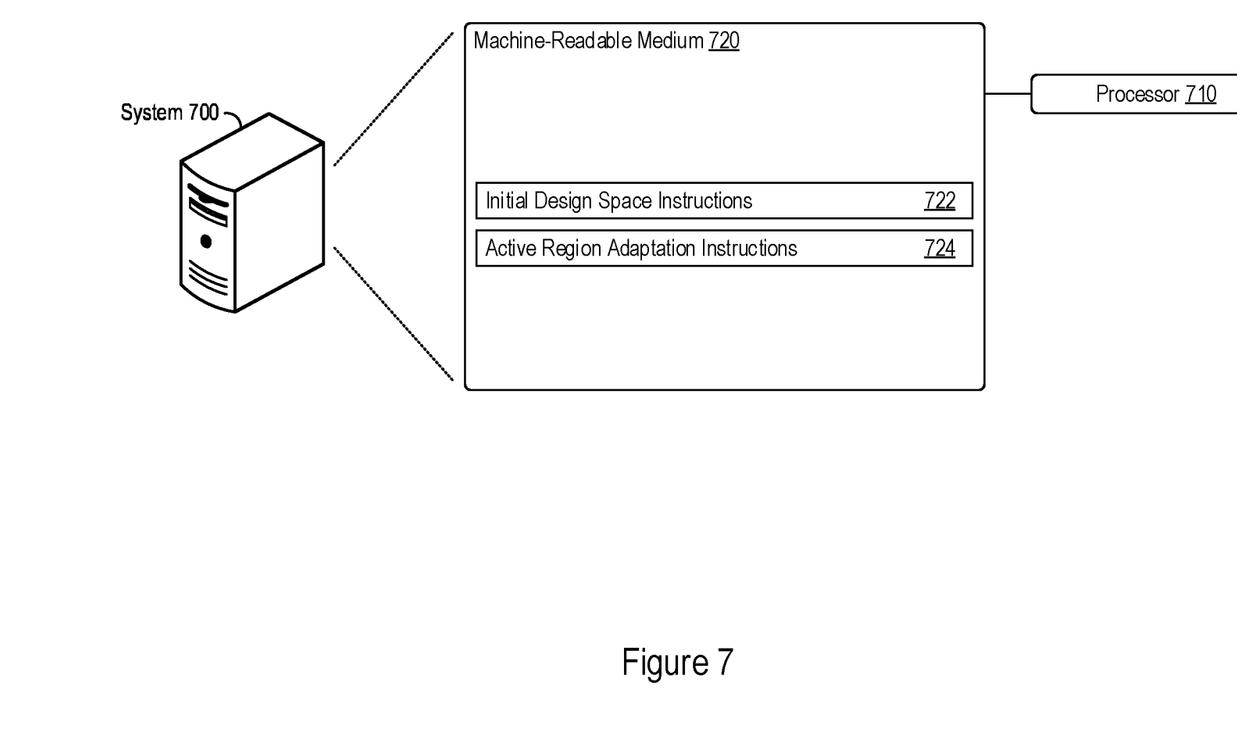
FIG. 7 shows an example of a computing system that supports active region adaptations for design domains in topology optimizations.

FIG. 7 shows an example of a computing system 700 that supports active region adaptations for design domains in topology optimizations. The system 700 may include a processor 710, which may take the form of a single or multiple processors. The processor(s) 710 may include a central processing unit (CPU), microprocessor, or any hardware device suitable for executing instructions stored on a machine-readable medium. The computing system 700 may include a machine-readable medium 720. The machine-readable medium 720 may take the form of any non-transitory electronic, magnetic, optical, or other physical storage device that stores executable instructions, such as the initial design space instructions 722 and the active region adaptation instructions 724 shown in FIG. 7. As such, the machine-readable medium 720 may be, for example, Random Access Memory (RAM) such as a dynamic RAM (DRAM), flash memory, spin-transfer torque memory, an Electrically-Erasable Programmable Read-Only Memory (EEPROM), a storage drive, an optical disk, and the like.

The computing system 700 may execute instructions stored on the machine-readable medium 720 through the processor 710. Executing the instructions (e.g., the initial design space instructions 722 and/or the active region adaptation instructions 724) may cause the system 700 to perform any of the active region adaptation features described herein, including according to any of the features with respect to the initial design space engine 108, the active region adaptation engine 110, or a combination of both.

For example, execution of the initial design space instructions 722 by the processor 710 may cause the computing system 700 to identify a design domain for which to optimize a topology based on an objective function, the design domain comprising multiple design elements. Execution of the initial design space instructions 722 by the processor 710 may also cause the system 700 determine an active region for the design domain, the active region comprising a selected set of active design elements in the design domain.

Execution of the active region adaptation instructions 724 by the processor 710 may cause the computing system 700 to iteratively adapt the active region, including by, for a given adaptation cycle: expanding the design domain to include branch design elements within a threshold element distance from the active design elements in the active region; performing FEA on the expanded design domain based on the objective function, including computing a respective sensitivity value based on the objective function for the design elements of the expanded design domain; determining an adapted active region; and setting the adapted active region as the active region for a subsequent adaptation cycle.

Determination of the adapted active region may be done by the computing system 700 by activating, as active design elements, any of the branch design elements with a computed sensitivity value that exceeds an active sensitivity threshold and deactivating, from the active region, any active design element with a design variable value that changes less than a threshold amount from a previous adaptation cycle. Execution of the active region adaptation instructions 724 by the processor 710 may further cause the computing system 700 to continue to iteratively adapt the active region until an optimization ending criterion is satisfied.

Any additional or alternative features as described herein may be implemented via the initial design space instructions 722, active region adaptation instructions 724, or a combination of both.

The systems, methods, devices, and logic described above, including the initial design space engine 108 and the active region adaptation engine 110, may be implemented in many different ways in many different combinations of hardware, logic, circuitry, and executable instructions stored on a machine-readable medium. For example, the initial design space engine 108, the active region adaptation engine 110, or combinations thereof, may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. A product, such as a computer program product, may include a storage medium and machine-readable instructions stored on the medium, which when executed in an endpoint, computer system, or other device, cause the device to perform operations according to any of the description above, including according to any features of the initial design space engine 108, the active region adaptation engine 110, or combinations thereof.

The processing capability of the systems, devices, and engines described herein, including the initial design space engine 108 and the active region adaptation engine 110, may be distributed among multiple system components, such as among multiple processors and memories, optionally including multiple distributed processing systems or cloud/network elements. Parameters, databases, and other data structures may be separately stored and managed, may be incorporated into a single memory or database, may be logically and physically organized in many different ways, and may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library (e.g., a shared library).

While various examples have been described above, many more implementations are possible.

The invention claimed is:

1. A method comprising:
by a computing system:
identifying a design domain for which to optimize a topology based on an objective function, the design domain comprising a bounding box for an unknown topology discretized into multiple design elements;
determining an active region for the design domain, the active region comprising a selected set of active design elements in the design domain, wherein determining the active region for the design domain comprises:
performing finite element analysis (FEA) for design elements in the bounding box based on the objective function;
computing sensitivity values for design elements in the bounding box; and
selecting, as the active design elements of the active region, design elements in the bounding box that exceed a bounding sensitivity threshold;
iteratively adapting the active region, including by, for a given adaptation cycle:

expanding the design domain to include branch design elements within a threshold element distance from the active design elements in the active region;

performing the FEA on the expanded design domain based on the objective function, including computing a respective sensitivity value based on the objective function for the design elements of the expanded design domain;

determining an adapted active region by:
activating, as active design elements, any of the branch design elements with a computed sensitivity value that exceeds an active sensitivity threshold; and deactivating, from the active region, any active design element with a design variable value that changes less than a threshold amount from a previous adaptation cycle; and setting the adapted active region as the active region for a subsequent adaptation cycle; and continuing to iteratively adapt the active region until an optimization ending criterion is satisfied.

2. The method of claim 1, wherein the optimization ending criterion is satisfied when a difference between a value of the objective function between adaptation cycles is less than an optimization process ending value.

3. The method of claim 1, wherein the optimization ending criterion is satisfied when the active region does not include any active design elements.

4. The method of claim 1, wherein the active sensitivity threshold is a function of the computed sensitivity values for the active region of a previous adaptation cycle.

5. The method of claim 1, wherein the bounding sensitivity threshold is different from the active sensitivity threshold.

6. The method of claim 1, comprising performing multiple iterations of the FEA in the given adaptation cycle prior to determining the adapted active region.

7. A system comprising:
an initial design space engine, comprising hardware, configured to
identify a design domain for which to optimize a topology based on an objective function, the design domain comprising a bounding box for an unknown topology discretized into multiple design elements; and determine an active region for the design domain, the active region comprising a selected set of active design elements in the design domain, including by:
performing finite element analysis (FEA) for design elements in the bounding box based on the objective function;
computing sensitivity values for design elements in the bounding box; and
selecting, as the active design elements of the active region, design elements in the bounding box that exceed a bounding sensitivity threshold; and an active region adaptation engine, comprising hardware, configured to:
iteratively adapt the active region, including by, for a given adaptation cycle:
expanding the design domain to include branch design elements within a threshold element distance from the active design elements in the active region;
performing the FEA on the expanded design domain based on the objective function, including computing a respective sensitivity value based on the objective function for the design elements of the expanded design domain;

determining an adapted active region by:
activating, as active design elements, any of the branch design elements with a computed sensitivity value that exceeds an active sensitivity threshold; and deactivating, from the active region, any active design element with a design variable value that changes less than a threshold amount from a previous adaptation cycle; and setting the adapted active region as the active region for a subsequent adaptation cycle; and continue to iteratively adapt the active region until an optimization ending criterion is satisfied.

8. The system of claim 7, wherein the optimization ending criterion is satisfied when a difference between a value of the objective function between adaptation cycles is less than an optimization process ending value.

9. The system of claim 7, wherein the optimization ending criterion is satisfied when the active region does not include any active design elements.

10. The system of claim 7, wherein the active sensitivity threshold is a function of the computed sensitivity values for the active region of a previous adaptation cycle.

11. The system of claim 7, wherein the bounding sensitivity threshold is different from the active sensitivity threshold.

12. The system of claim 7, wherein the active region adaptation engine is configured to perform multiple iterations of the FEA in the given adaptation cycle prior to determining the adapted active region.

13. A non-transitory machine-readable medium comprising instructions that, when executed by a processor, cause a computing system to:
identify a design domain for which to optimize a topology based on an objective function, the design domain comprising a bounding box for an unknown topology discretized into multiple design elements;

determine an active region for the design domain, the active region comprising a selected set of active design elements in the design domain, including by:
performing finite element analysis (FEA) for design elements in the bounding box based on the objective function;
computing sensitivity values for design elements in the bounding box; and
selecting, as the active design elements of the active region, design elements in the bounding box that exceed a bounding sensitivity threshold;

iteratively adapt the active region, including by, for a given adaptation cycle:
expanding the design domain to include branch design elements within a threshold element distance from the active design elements in the active region;
performing finite element analysis (FEA) on the expanded design domain based on the objective function, including computing a respective sensitivity value based on the objective function for the design elements of the expanded design domain;

determining an adapted active region by:
activating, as active design elements, any of the branch design elements with a computed sensitivity value that exceeds an active sensitivity threshold; and deactivating, from the active region, any active design element with a design variable value that changes less than a threshold amount from a previous adaptation cycle; and setting the adapted active region as the active region for a subsequent adaptation cycle; and continue to iteratively adapt the active region until an optimization ending criterion is satisfied.

14. The non-transitory machine-readable medium of claim 13, wherein the optimization ending criterion is satisfied when a difference between a value of the objective function between adaptation cycles is less than an optimization process ending value.

15. The non-transitory machine-readable medium of claim 13, wherein the optimization ending criterion is satisfied when the active region does not include any active design elements.

16. The non-transitory machine-readable medium of claim 13, wherein the active sensitivity threshold is a function of the computed sensitivity values for the active region of a previous adaptation cycle.

17. The non-transitory machine-readable medium of claim 13, wherein the bounding sensitivity threshold is different from the active sensitivity threshold.

* * * * *